US006935949B1

(12) United States Patent
Murphy

(10) Patent No.: US 6,935,949 B1
(45) Date of Patent: Aug. 30, 2005

(54) CONTINUOUS PLAY SLOT MACHINE AND RETROFIT KIT

(76) Inventor: Charles S. Murphy, 3 Pellican La., Edgewater, FL (US) 32141

(*) Notice: Subject to any disclaimer, the term of this patent is extended or adjusted under 35 U.S.C. 154(b) by 460 days.

(21) Appl. No.: 10/134,007

(22) Filed: Apr. 29, 2002

(51) Int. Cl.[7] .............................................. A63F 13/00
(52) U.S. Cl. .......................................... 463/20; 463/25
(58) Field of Search ........................ 463/16–17, 20–22, 463/25, 37; 273/143 R, 237

(56) References Cited

U.S. PATENT DOCUMENTS 5,067,712 A 11/1991 Georgilas
5,609,524 A 3/1997 Inoue
5,813,511 A 9/1998 Takemoto et al.
5,934,672 A 8/1999 Sines et al.
6,012,983 A 1/2000 Walker et al.
6,203,430 B1 3/2001 Walker et al.
6,244,957 B1 * 6/2001 Walker et al. ................ 463/20
6,270,410 B1 8/2001 DeMar et al.
6,315,662 B1 11/2001 Jorasch et al.
2003/0162582 A1 * 8/2003 Gordon ....................... 463/20

* cited by examiner

*Primary Examiner*—Kim Nguyen
(74) *Attorney, Agent, or Firm*—Paul S. Rooy, P.A.

(57) ABSTRACT

A continuous play slot machine having a continuous play switch connected to a timing and logic controller. Actuation of the continuous play switch initiates continuous play, wherein the timing and logic controller directs the continuous play slot machine to continue play until insufficient credit to play remains on the continuous play slot machine. A pre-set time lapse occurs between plays to afford a gamer playing the continuous play slot machine the option to return to manual play by re-actuating the continuous play switch. The continuous play slot machine also reverts to manual play when insufficient credit to play remains. In an alternate embodiment, continuous play slot machine reverts to manual play when its reels achieve a winning combination. A gamer using the continuous play slot machine may take a drink, converse with bystanders, light a cigarette, etc., without having to interrupt his slot machine play.

19 Claims, 4 Drawing Sheets

CONTINUOUS PLAY SLOT MACHINE AND RETROFIT KIT

BACKGROUND OF THE INVENTION

1. Field of the Invention

This invention relates to slot machines, and in particular to a continuous play slot machine and retrofit kit.

2. Background of the Invention

Slot machines are a type of gaming device which typically feature a handle or a switch button which actuates a reel spinning mechanism. The reel spinning mechanism spins a number of reels upon which illustrations are printed. When the reels stop, if a winning combination of illustrations is visible through a slot machine window, then the slot machine pays winnings. The slot machine winnings are payable either via coins counted into a slot machine coin tray, or by an attendant if the winnings amount is high enough.

Hours of entertaining and potentially profitable play can be derived from slot machines. Unfortunately, conventional slot machines require a separate actuation of the reel spinning mechanism every time a new play is to be initiated. Thus an individual gamer is hard-pressed to play two or more machines simultaneously. In addition, if the gamer wishes take a drink, converse with bystanders, light a cigarette, etc., then he must cease play while engaging in such activity.

Many individuals who play slot machines are older individuals, who become fatigued having to repeatedly pull a lever or depress a spin switch over a lengthy period of time. In addition, handicapped individuals may find play difficult or impossible where a handle or switch must repeatedly be actuated. Even healthy individuals may become fatigued after hours of play.

Thus, it would be advantageous to provide a slot machine which is capable of playing continuously by itself, without input from a gamer, so long as available credit remains, and which ceases play when winnings are disbursed or when its credit has been depleted. Simplicity and retrofittability would be desirable attributes of such a slot machine control system.

Existing Designs

A number of patents have issued for slot machines which are automated to a greater or lesser degree. Walker et al. received U.S. Pats. No. 6,012,983 and 6,244,957 for an automated gaming device. These patents taught slot machines which suffered from a number of drawbacks. Considerable data had to be entered in order to use them, and a credit card was required. These patents taught a remote communications device which was to be carried by individuals using the slot machines. Thus, complexity and cost rendered these designs undesirable, and retrofit cost would have been high.

U.S. Pat. No. 5,067,712 issued to Georgilas for a slot machine design which provided an extra play if a gamer did not achieve a winning combination during the first reel spin. U.S. Pat. No. 5,067,524 was issued to Inoue for a slot machine which afforded a special reel movement upon a gamer achieving a winning combination, to help inexperienced garners recognize winning combinations. While these designs were interesting, they did not provide for continuous play of a slot machine limited only by the remaining credit and commands from the gamer.

Takemoto et al. were granted U.S. Pat. No. 5,813,511 for a slot machine which would spin its reels when a predetermined number of coins was inserted into its coin slot. While this design eliminated the need for a handle or switch to actuate the reel spinning mechanism, it still required the insertion of a pre-determined number of coins to spin its reels.

DeMar et al. were granted U.S. Pat. No. 6,270,410 for a slot machine remote control which operated one or more slot machines remotely. This scheme required a remote control or computer external to the slot machine(s) to be controlled, and suffered from the drawbacks of complexity and cost.

SUMMARY OF THE INVENTION

Accordingly, it is an object of the present invention to provide a continuous play slot machine which, when commanded by a gamer, will play continuously without the gamer having to initiate play each time the reels are to be spun. Design features allowing this object to be accomplished include a continuous play switch electrically connected to a timing and logic controller. Advantages associated with the accomplishment of this object include the ability of a gamer to take a drink, converse with bystanders, light a cigarette, etc., without having to interrupt his slot machine play. Additional advantage associated with the accomplishment of this object is maximization of the efficiency of use of the slot machine, and enhancement of the gambling house's profits, as well as reduction of fatigue in older, handicapped and even healthy players.

It is another object of the present invention to provide a continuous play slot machine which delays each successive play by a predetermined time lapse. Design features allowing this object to be accomplished include a timing and logic controller which controls reel spin. A benefit associated with the accomplishment of this object is the ability of a gamer to cease the continuous play function at any time he desires by re-actuating the continuous play switch.

It is still another object of this invention to provide a continuous play slot machine which ceases continuous play when the reels stop at a winning combination. Design features allowing this object to be accomplished include a timing and logic controller which controls reel spin. An advantage associated with the realization of this object is the ability for a gamer to take advantage of the stopped play to collect his winnings upon achieving a winning reel combination.

It is another object of the present invention to provide a continuous play slot machine which ceases continuous play upon exhaustion of credit on the machine. Design features allowing this object to be accomplished include a timing and logic controller which controls reel spin. A benefit associated with the accomplishment of this object is control of the slot machine to avoid deficit play to the detriment of the gaming house.

It is still another object of this invention to provide a continuous play kit which can easily be retrofitted into existing slot machines. Design features enabling the accomplishment of this object include a continuous play kit incorporating a continuous play switch and a timing and logic controller. Advantages associated with the realization of this object include reduced installation cost and hence increased availability to gaming houses, and their consequent improved profits and customer satisfaction.

BRIEF DESCRIPTION OF THE DRAWINGS

The invention, together with the other objects, features, aspects and advantages thereof will be more clearly understood from the following in conjunction with the accompanying drawings.

Three sheets of drawings are provided. Sheet one contains FIG. 1. Sheet two contains FIG. 2. Sheet three contains FIG. 3.

DETAILED DESCRIPTION OF THE PREFERRED EMBODIMENT

Figure 1:
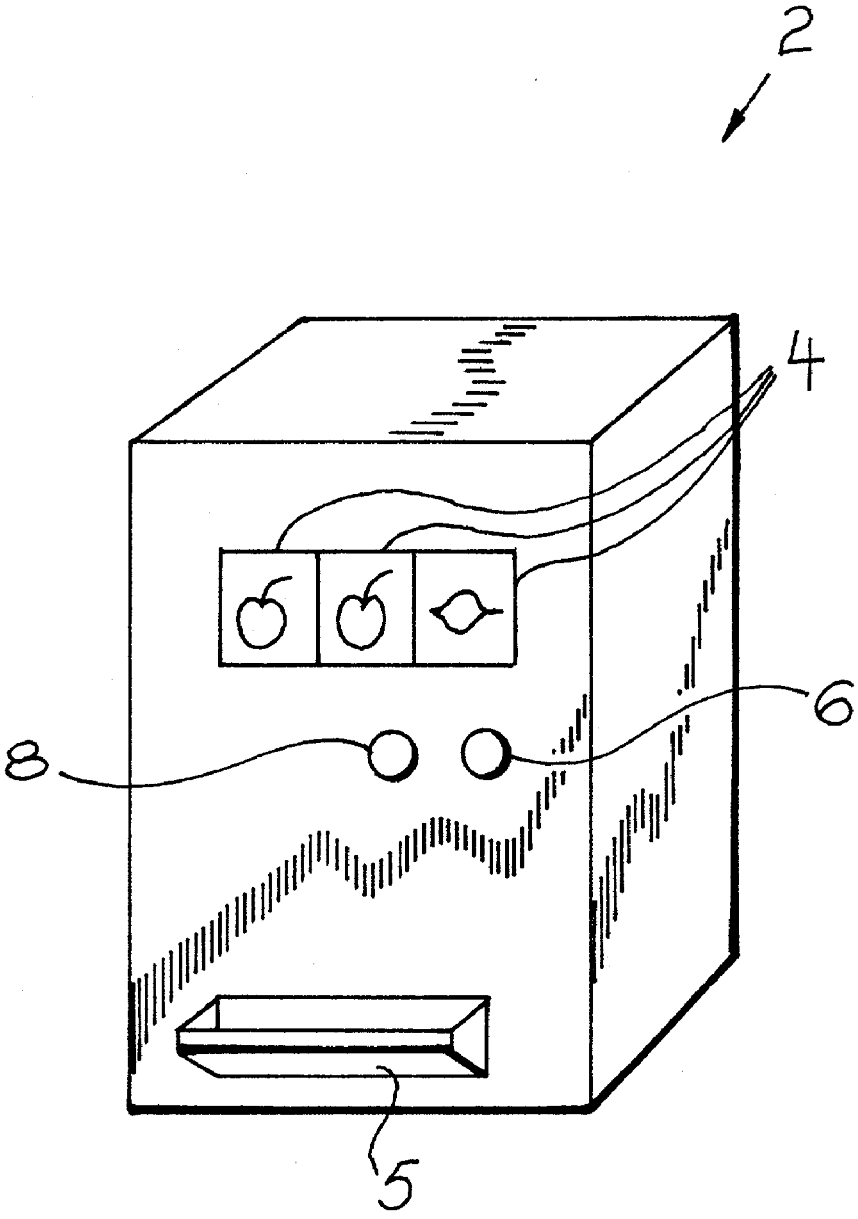
FIG. 1 is a front isometric view of a continuous play slot machine.

FIG. 1 is a front isometric view of continuous play slot machine 2. Continuous play slot machine 2 comprises reels 4, spin reels switch 6 and continuous play switch 8. During conventional, manual play, a gamer would deposit sufficient money to play at least once, and then actuate spin reels switch 6 in order to cause a reel spinning mechanism to spin reels 4. If reels 4 stop at a winning combination, winnings are dispensed into winnings tray 5, or the gamer receives a hand pay. If enough credit remains on the machine for another play the gamer can initiate same by again actuating spin reels switch 6.

Figure 2:
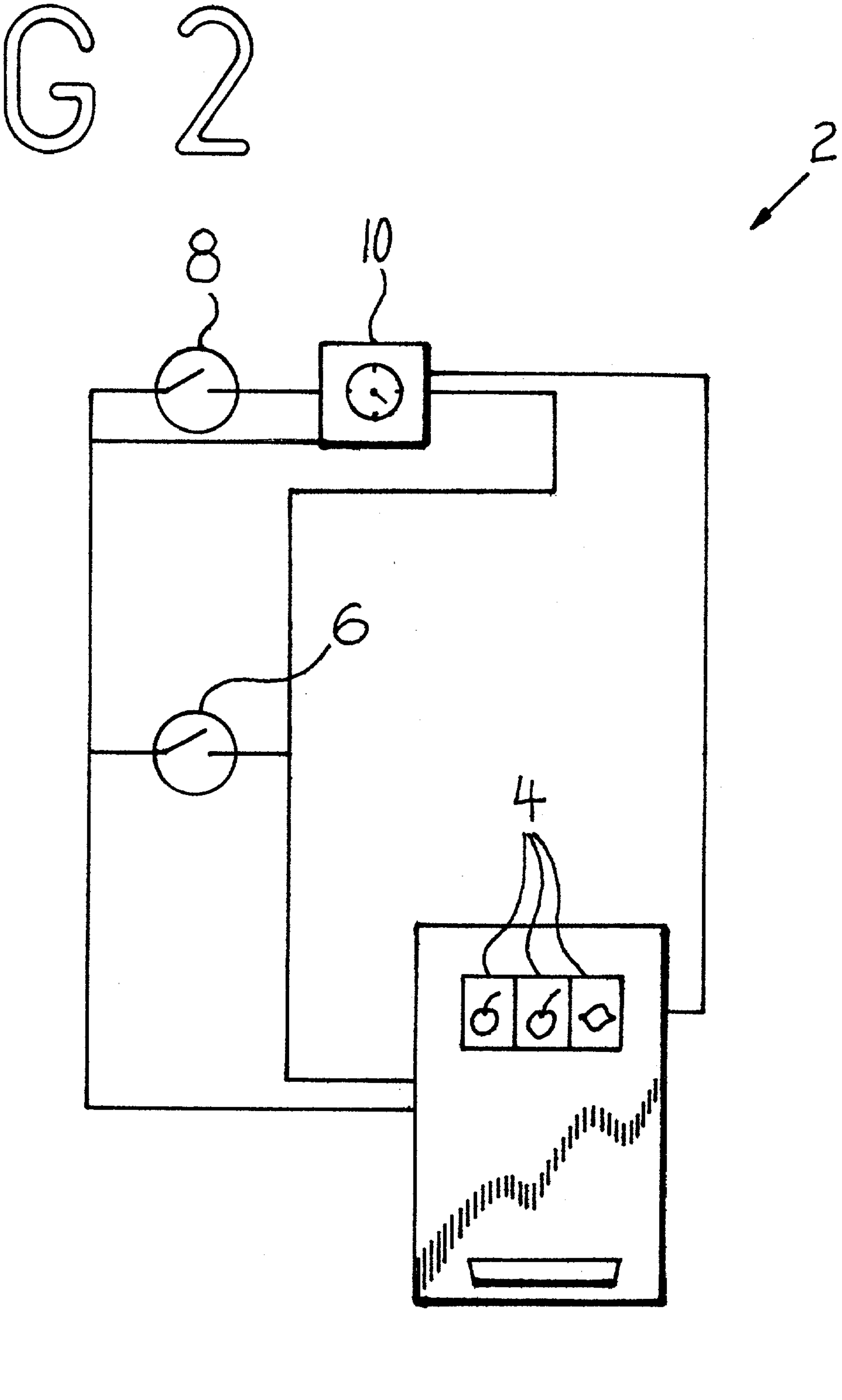
FIG. 2 is a schematic view of a continues play slot machine.

Continuous play can be initiated on continuous play slot machine 2 by actuating continuous play switch 8. FIG. 2 is a schematic view of continuous play slot machine 2. As may be observed, timing and logic controller 10 is electrically connected to continuous play switch 8, as well as to a reel spinning mechanism for reels 4, a credit sensor, and a winning combination sensor (reel spinning mechanism and sensors not depicted).

Figure 3:
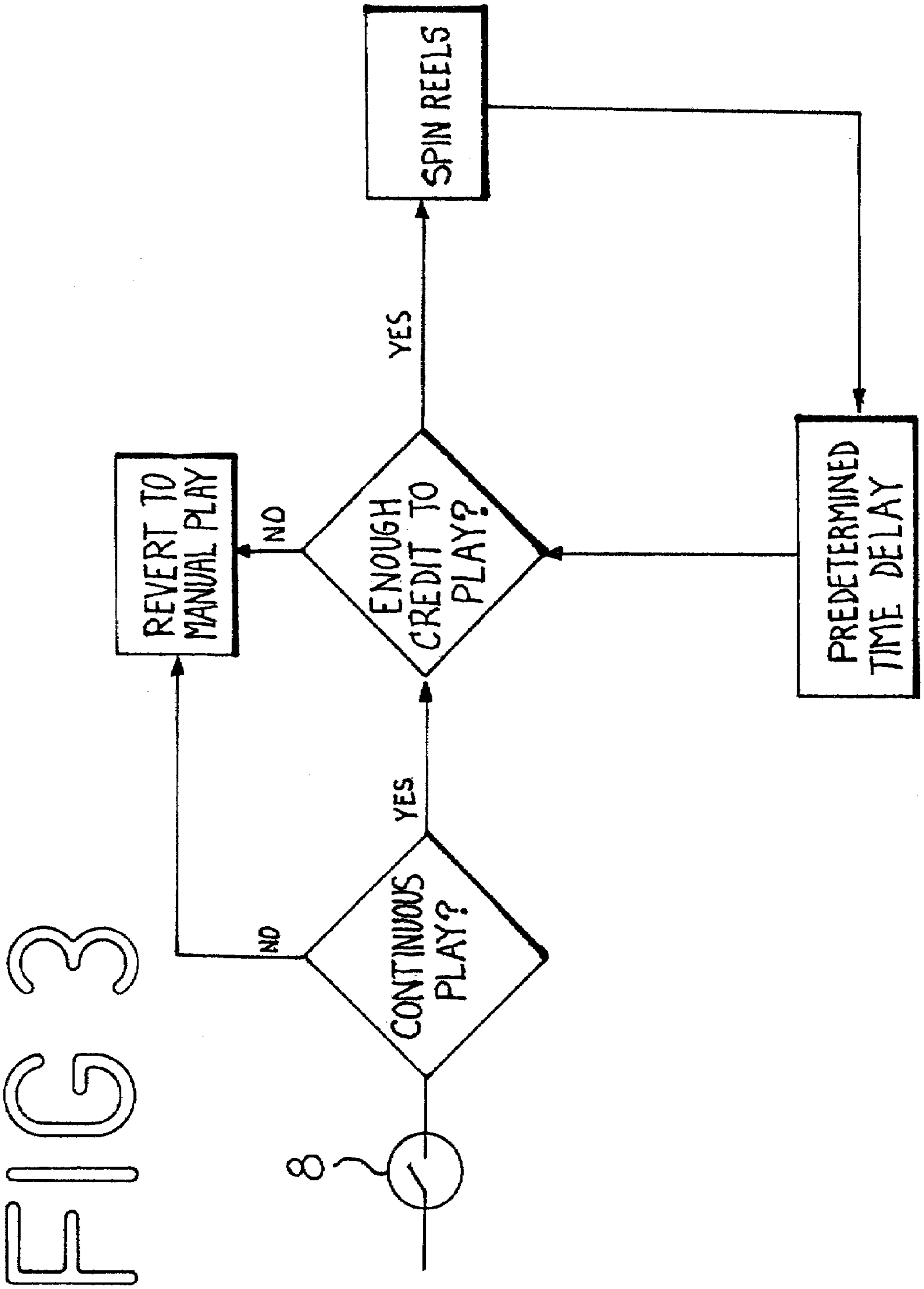
FIG. 3 is a schematic diagram of the timing and logic controller.

FIG. 3 is a schematic diagram of timing and logic controller 10. Actuation of continuous play switch 8 engages timing and logic controller 10, which initially checks that enough credit for play remains, and if so instructs reel spinning mechanism to spin reels 4. After reels 4 stop, any win credit is recorded. Timing and logic controller 10 then waits a predetermined time delay and then determines if sufficient credit for play remains on continuous play slot machine 2. If no, continuous play slot machine 2 reverts to manual play, and additional credit must be supplied prior to any further play. If enough credit for play remains, timing and logic controller 10 again directs reel spinning mechanism to spin reels 4, and the above described decision tree repeats.

Figure 4:
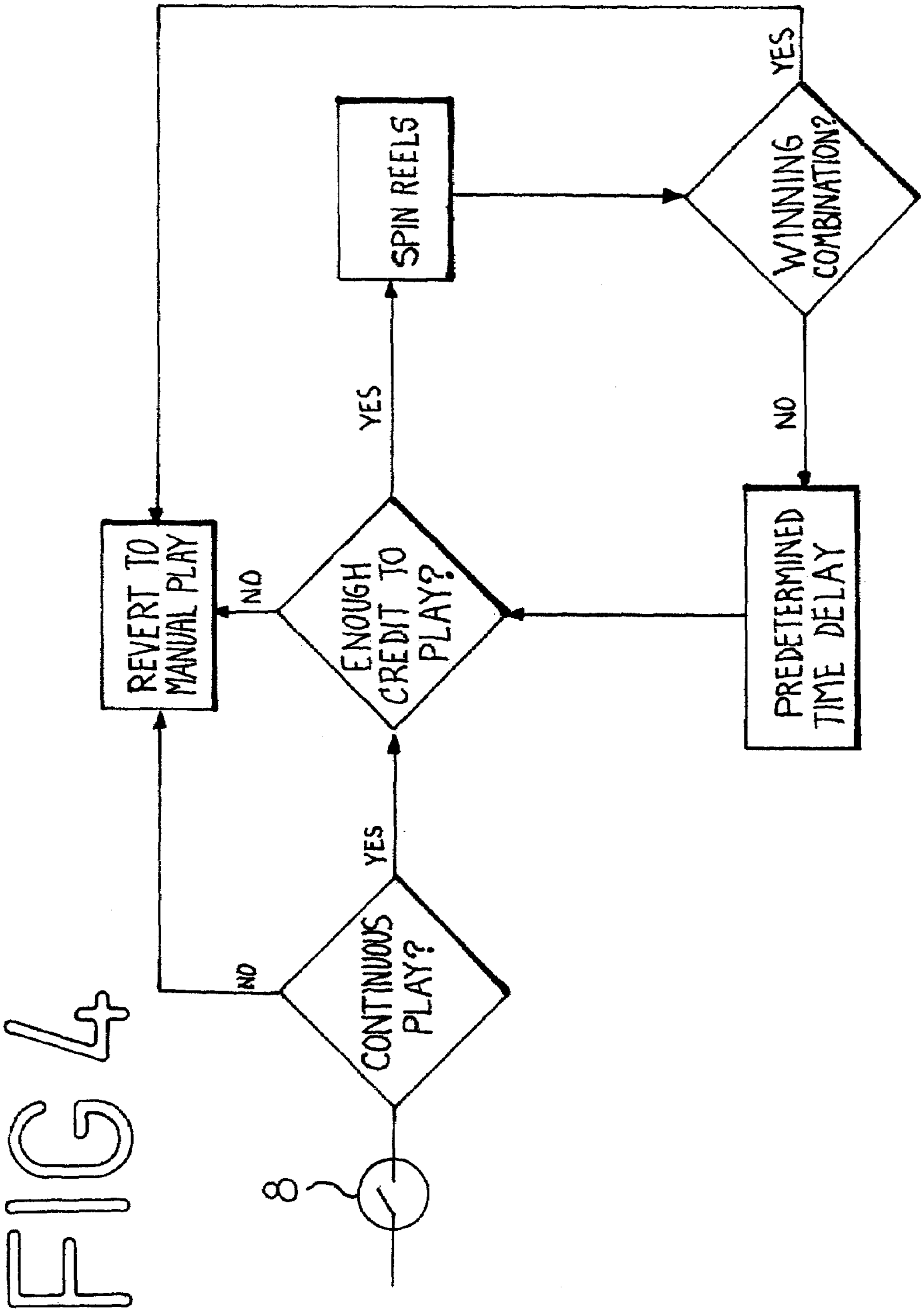
FIG. 4 is a schematic diagram of an alternate embodiment timing and logic controller.

An alternate embodiment timing and logic controller 10 is depicted in FIG. 4. In the alternate embodiment, when reels 4 stop, if a winning combination is achieved continuous play slot machine 2 reverts to manual play and payment is made to the gamer. If continuous play is subsequently desired, continuous play switch 8 is then re-actuated. If no winning combination is achieved, timing and logic controller 10 then waits a preset time interval and then determines if sufficient credit for play remains on continuous play slot machine 2. If no, continuous play slot machine 2 reverts to manual play, and additional credit must be supplied prior to any further play. If enough credit for play remains, timing and logic controller 10 again directs reel spinning mechanism to spin reels 4, and the above described decision tree repeats.

Continuous play slot machine 2 may be manually directed to return to manual play mode at any time by simply re-actuating continuous play switch 8. Thus, successively actuating continuous play switch 8 has the effect of toggling continuous play slot machine 2 between continuous play and manual play.

A continuous play retrofit kit is also intended to be within the scope of the present disclosure. The continuous play retrofit kit comprises timing and logic controller 10 connected to continuous play switch 8. The retrofit installation includes the steps of connecting timing and logic controller 10 to the reel spinning mechanism and to the credit sensor of an existing slot machine. Timing and logic controller 10 may also be connected to a winning combination sensor in the existing slot machine. Thus, the continuous play retrofit kit disclosed herein may be quickly and inexpensively installed on an existing slot machine.

In the preferred embodiment, spin reels switch 6 and continuous play switch 8 were commercially available momentary contact switches. All slot machine components, including the credit sensor and the winning combination sensor are existing slot machine components, and readily available commercially. Timing and logic controller 10 may be a computer chip, electronic, electro-mechanical, mechanical, or other appropriate mechanism and/or circuit or digital processing unit. The connections between timing and logic controller 10 and continuous play switch 8, reels 4 and the credit and winning combination sensors may be electrical, mechanical, or some combination thereof, depending on the principal of operation of timing and logic controller 10.

While a preferred embodiment of the invention has been illustrated herein, it is to be understood that changes and variations may be made by those skilled in the art without departing from the spirit of the appending claims.

DRAWING ITEM INDEX

2 continuous play slot machine
4 reel
5 winnings tray
6 spin reels switch
8 continuous play switch
10 timing and logic controller

I claim:

1. A continuous play slot machine comprising a continuous play switch electrically connected to a timing and logic controller, whereby said continuous play slot machine may play repeatedly following pre-set time lapses, and wherein successive actuation of said continuous play switch toggles said continuous play slot machine between continuous play mode and manual play mode.

2. The continuous play slot machine of claim 1 wherein said timing and logic controller is connected to a credit sensor, whereby said timing and logic controller directs said continuous play slot machine to revert to manual play should insufficient credit to play remain on said continuous play slot machine.

3. The continuous play slot machine of claim 2 further comprising a winning combination sensor connected to said timing and logic controller, whereby said continuous play slot machine reverts to said manual play mode upon continuous play slot machine reels achieving a winning combination.

4. The continuous play slot machine of claim 3 wherein said timing and logic controller is an electromechanical timing and logic controller.

5. The continuous play slot machine of claim 2 wherein said timing and logic controller is a digital processing unit.

6. The continuous play slot machine of claim 2 wherein said timing and logic controller is an electronic timing and logic controller.

7. The continuous play slot machine of claim 2 wherein said timing and logic controller is a mechanical timing and logic controller.

8. A continuous play slot machine comprising a timing and logic controller connected to a continuous play switch and a credit sensor, whereby said continuous play slot machine may play repeatedly following pre-set time lapses and wherein said timing and logic controller directs said continuous play slot machine to revert to manual play should insufficient credit to play remain on said continuous play slot machine, and wherein successive actuation of said continuous play switch toggles said continuous play slot machine between continuous play mode and manual play mode.

9. The continuous play slot machine of claim 8 further comprising a winning combination sensor connected to said timing and logic controller, whereby said continuous play slot machine reverts to said manual play mode upon continuous play slot machine reels achieving a winning combination.

10. The continuous play slot machine of claim 8 wherein said timing and logic controller is a digital processing unit.

11. The continuous play slot machine of claim 8 wherein said timing and logic controller is an electronic timing and logic controller.

12. The continuous play slot machine of claim 8 wherein said timing and logic controller is a mechanical timing and logic controller.

13. The continuous play slot machine of claim 8 wherein said timing and logic controller is an electromechanical timing and logic controller.

14. A retrofit continuous play kit for a slot machine comprising a timing and logic controller connected to a continuous play switch, said timing and logic controller intended to be connected to a reel spinning mechanism and a credit sensor within said an existing slot machine, whereby said slot machine may play repeatedly following pre-set time lapses and wherein said timing and logic controller directs said slot machine to revert to manual play should insufficient credit to play remain on said slot machine, and wherein successive actuation of said continuous play switch toggles said continuous play slot machine between continuous play mode and manual play mode.

15. The retrofit continuous play kit for a slot machine of claim 14 wherein said timing and logic controller is further intended to be connected to a winning combination sensor, whereby said continuous play slot machine reverts to said manual play mode upon continuous play slot machine reels achieving a winning combination.

16. The continuous play slot machine of claim 14 wherein said timing and logic controller is a digital processing unit.

17. The continuous play slot machine of claim 14 wherein said timing and logic controller is an electronic timing and logic controller.

18. The continuous play slot machine of claim 14 wherein said timing and logic controller is a mechanical timing and logic controller.

19. The continuous play slot machine of claim 14 wherein said timing and logic controller is an electromechanical timing and logic controller.

* * * * *